United States Patent [19]
Kojima

[11] Patent Number: 5,539,887
[45] Date of Patent: Jul. 23, 1996

[54] INPUT BUFFER CIRCUIT FOR A MICROPROCESSOR WHICH PREVENTS IMPROPER DATA INPUT

[75] Inventor: Shingo Kojima, Tokyo, Japan

[73] Assignee: NEC Corporation, Japan

[21] Appl. No.: 479,848

[22] Filed: Jun. 7, 1995

Related U.S. Application Data

[63] Continuation of Ser. No. 18,705, Feb. 17, 1993, abandoned.

[30] Foreign Application Priority Data

Feb. 17, 1992 [JP] Japan .................... 4-029373

[51] Int. Cl.⁶ .......................... G06F 13/00; H03K 19/00
[52] U.S. Cl. .......................... 395/250; 395/872; 364/239; 364/239.7; 326/21; 326/56
[58] Field of Search ........................... 395/250, 872; 326/21, 564

[56] References Cited

U.S. PATENT DOCUMENTS

| | | |
|---|---|---|
| 4,731,553 | 3/1988 | Van Lehn et al. . |
| 4,952,367 | 8/1990 | Porter et al. . |
| 4,954,729 | 9/1990 | Urai . |
| 4,961,010 | 10/1990 | Davis . |
| 5,038,313 | 8/1991 | Kojima .................. 364/736.5 |
| 5,151,621 | 9/1992 | Goto . |
| 5,239,214 | 8/1993 | Segawa et al. . |
| 5,285,117 | 2/1994 | Furutani . |
| 5,285,119 | 2/1994 | Takahashi . |

*Primary Examiner*—Krisna Lim
*Attorney, Agent, or Firm*—Ostrolenk, Faber, Gerb & Soffen

[57] ABSTRACT

The present invention provides an input buffer circuit which prevents, when a microprocessor reads an external data bus upon bus sizing, a microprocessor from fetching an intermediate potential of the external data bus. READY terminal 3 is connected to one of a pair of input terminals of NOR gate 12 via latches 7 and 8, and lower data input terminal 4 is connected to the other input terminal of NOR gate 12. The output terminal of NOR gate 12 is connected to a data input terminal of data latch 14. SZRQ terminal 2 is connected to one of a pair of input terminals of NAND gate 10 via latches 5 and 6, and the output of latch 8 is connected to the other input terminal of NAND gate 10 via inverter 9. The output terminal of NAND gate 10 and upper data input terminal 1 are connected to input terminals of NOR gate 11, and the output terminal of NOR gate 11 is connected to an input terminal of data latch 13. Output terminals of data latches 13 and 14 serve as output terminals of the input buffer circuit.

5 Claims, 6 Drawing Sheets

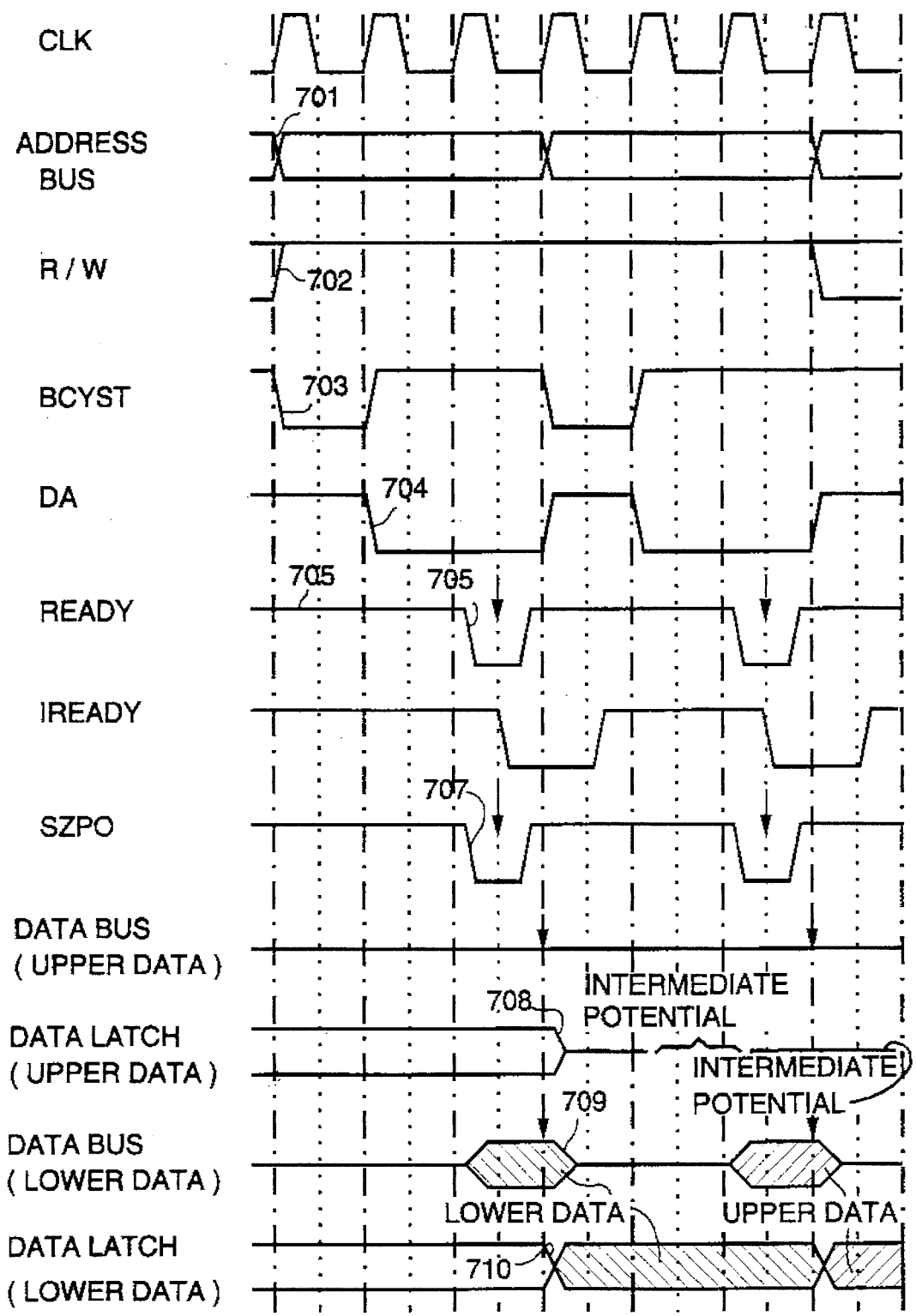

INPUT BUFFER CIRCUIT FOR A MICROPROCESSOR WHICH PREVENTS IMPROPER DATA INPUT

This is a continuation of application Ser. No. 08/018,705 filed on Feb. 17, 1993, now abandoned.

BACKGROUND OF THE INVENTION

1. Field of the Invention

This invention relates to a semiconductor integrated circuit, and more particularly to an input buffer circuit for a data bus.

2. Description of the Related Art

Conventional semiconductor integrated circuits such as microprocessors are normally so constructed that a control signal indicative of an input timing is generated from a bus control circuit to control an input buffer for an external bus in order to fetch information on the external bus with a particular timing. An example of the conventional apparatus is described below.

FIG. 1 is a block diagram showing a model of a microprocessor and a memory interface. Microprocessor 15 and memory system 16 are interconnected by address bus 18, control signal paths 110 and 120, and data bus 24. Address bus 18 sends an address signal from microprocessor 15 to memory 16. Control signal path 110 serves as a signal path for R/W (Read and Write) signal 19, BCYST (Bus Cycle Start) signal 20 and DA (Data Access) signal 21 from microprocessor 110. R/W signal 19 is an instruction signal from microprocessor 15 which indicates writing by its low level and reading by its high level. BCYST signal 20 is a negative logic instruction signal from microprocessor 15 which indicates start of a bus cycle. DA signal 21 is a negative logic signal from microprocessor 15 which indicates a timing for access to data. Bidirectional data bus 24 is a signal path which transfers data between microprocessor 15 and memory system 16. Control signal path 120 serves as signal path for READY signal 22 and SZRQ (Size Request) signal 23 from memory system 16. READY signal 22 is a negative logic signal for indicating that memory system 16 is ready to transfer data. SZRQ signal 23 is a negative logic signal for indicating that data must be transferred with the 16-bit unit. Further, clock signal 17 is an internal clock signal of microprocessor 15.

When microprocessor 15 has a 32-bit unit bus, in order to minimize system cost and assure an interface with a 16-bit peripheral apparatus, the function of limiting the bus available to transfer 16-bit data, that is, the bus sizing function, is prepared in the normal manner. Here, data transfer without bus sizing is described first.

FIG. 2 shows a timing chart of a memory read bus cycle without bus sizing. The relationship between data and control signals between microprocessor 15 and memory system 16 is described below with reference to FIGS. 1 and 2. When microprocessor 15 starts to read data from memory system 16, microprocessor 15 inputs a memory address for reading into address bus 18 (transition 601) in synchronism with a rising edge of clock signal 17, simultaneously, R/W signal 19 changes to a high level to designate read-out (transition 602), and thereafter makes BCYST signal 20 active (transition 603). Memory system 16 prepares, information stored at the designated address according to the data inputted by microprocessor 15 and maintains READY signal 22 inactive (transition 605, "transition" is omitted hereafter) until it is prepared to output the information to data bus 24.

Microprocessor 15 inputs BCYST signal 20 active only for one clock interval at the same time as it inputs the memory address, and renders DA signal 21 active in place of rendering BCYST signal 20 inactive, thence thereby causing READY signal 22 to wait for memory system 16 (604). Memory system 16 send the designated data for the read-out into data bus 24 (607) and renders READY signal 22 active (606). While microprocessor 15 keeps DA signal 21 active, it samples READY signal 22 for each clock at the timing of the rising edge of the clock, and if it detects an active state, it fetches the data on data bus 24 into an internal buffer memory thereof at the timing of the rising edge of the next clock (608).

Through the operations described above, microprocessor 15 can read out data at any address from memory system 16.

Next, the case when bus sizing is involved is described with reference to FIG. 1 and to FIG. 3 which shows a timing chart upon bus sizing. In the example shown here, 32-bit data can be transferred by two operations for each 16 bits using SZRQ signal 23. As the bus cycle of microprocessor 15 is extended using READY signal 22 until memory system 16 is prepared to output data as shown in FIG. 2, memory system 16 is able to request the issue of an additional BCYST signal for transferring the upper 16 bits by causing microprocessor 15 recognizes that the bus cycle is sized using SZRQ signal 23. When microprocessor 15 starts to read out 32-bit data from memory system 16, a memory address for read-out is first sent into address bus 18 in synchronism with the rising edge of clock signal 17 (701), simultaneously R/W signal 19 is sent with a high level (702), and thereafter renders BCYST signal 20 active (low level) (703). Due to the request by the inputted signal, memory system 16 prepares information stored at the designated address and renders and thereafter maintains READY signal 22 inactive (high level) until it is prepared to output the information through data bus 24 (705). Microprocessor 15 renders BCYST signal 20 active during only one clock interval and then renders DA signal 21 active (low level) in place of BCYST signal 20 and thereafter waits for READY signal 22 outputted from memory system 16 (704).

Memory system 16 outputs only the lower 16 bits of the 32-bit data designated for read-out into data bus 24 for the lower 16 bits (709) and simultaneously renders READY signal 22 and SZRQ signal 23 active (706, 707). While microprocessor 15 keeps DA signal 21 active, it samples READY signal 22 and SZRQ signal 23 for every falling edge of the clock signals, and if it detects an active level of READY signal 22, it fetches data on data bus 24 into the internal buffer memory thereof at the timing of the rising edge of the next clock (710). In this instance, since SZRQ signal 23 detected at the same time is active, microprocessor 15 recognizes that only the lower 16 bits of the read in from data bus 24 are valid and an additional bus cycle for the upper 16 bits must necessarily be issued. Then, microprocessor 15 issues a bus cycle again by R/W signal 19, BCYST signal 20 and DA signal 21 via address bus 18. Since reading of the upper 16 bits by issuing the additional bus cycle is similar to the operation of the preceding reading bus cycle for the lower 16 bits, description thereof is omitted herein.

FIG. 4 is a circuit diagram of a conventional input buffer circuit. The conventional input buffer circuit includes NOR gate 12 to which lower data input terminal 4 is connected and READY terminal 3 is connected via latch 7 and another latch 8. The output terminal of NOR gate 12 is connected to a data input terminal of data latch 14. Upper data input terminal 1 and the output terminal of latch 8 are connected to the two input terminals of another NOR gate 11, and the output terminal of NOR gate 11 is connected to the input terminal of another data latch 13. The output terminals of data latches 13 and 14 serve as the output terminals of the input buffer circuit. It should be noted that the configuration described above is actually provided by 16 sets in the input buffer circuit, but only one set is shown in FIG. 4 for simplification of illustration.

Functions of the components described above are described hereunder. Upper data input terminal 1 inputs the upper 16 bits of data bus 24. The lower 16 bits of data bus 24 are inputted to lower data input terminal 4. READY terminal 3 is an input terminal through which a negative logic signal which communicates that preparations for transfer of data have been made at memory system 16 is inputted. Each of latches 7 and 8 synchronize a signal inputted thereto asynchronously from READY terminal 3 at the timing of the rising edge of the clock signal to make IREADY signal 80 for the input buffer circuit. Each of NOR gates 11 and 12 masks the inputted data through upper data input terminal 1 and lower data input terminal 4, respectively, to output a low level for any period other than when IREADY signal 80 exhibits a low level. Data latch 13 latches the output of NOR gate 11 at the timing of the rising edge of the clock signal. Data latch 14 latches the output of NOR gate 12 at the timing of the rising edge of the clock signal. It is assumed that clock signal CLK and reverse clock signal CLKB do not overlap each other at either a high level outputs or low level outputs due to a phase delay.

Operation of the conventional apparatus is described below with reference to the timing charts shown in FIGS. 2 and 3 and the circuit diagram shown in FIG. 4.

READY signal 22, which has been rendered active at timing 606 by memory system 16, is applied to READY terminal 3 and is synchronized with the falling edge of the clock signal by latches 7 and 8, and thereafter controls NOR gates 11 and 12 so that data inputted from upper data input terminal 1 and lower data input terminal 4 are applied to data latches 13 and 14, respectively. Data latches 13 and 14 individually latch the data inputted thereto synchronously with the next rising edge of the clock signal.

Operation of the apparatus shown in FIG. 4, wherein bus sizing is involved, is similar to the case described above, and lower data inputted in a first bus cycle and upper data inputted in a second bus cycle are combined by internal processing of microprocessor 15 and are used as 32-bit data. However, since no information of the bus sizing has been transmitted to the input buffer circuit itself, although data are applied only to lower data input terminal 4, both of data latch 13 for the upper 16 bits and data latch 14 for the lower 16 bits will detect an active state of READY signal 22 and latch all the value on the data bus at the timing of the rising edge of the next clock CLKB. In this instance, while there is the possibility that upper data input terminal 1 connected to the data bus presents an intermediate potential since it is not driven, data latch 13 for the upper 16 bits may latch the potential conditions of upper data input terminals 1 as is. This results in the drawback that power dissipation is increased because, even where the input buffer circuit is constructed with a CMOS (Complementary Metal Oxide Semiconductor) in order to minimize power dissipation, when the potential at the data bus is an intermediate potential, both P-channel type insulated gate field effect transistors and N-channel type insulated gate field effect transistors which constitute the upper data side circuit of the input buffer circuit simultaneously enter into a conductive condition causing through-current to flow from power source lines to grounding lines.

With the conventional input buffer circuit described above, when bus sizing is involved, there is the possibility that the upper data side of the data bus may be at an intermediate potential since it is not driven from the outside, and data latch 13, which is a circuit on the upper data side of the input buffer circuit, may fetch the intermediate potential. In this instance, transistors constituting data latch 13 become stabilized linearly, accordingly, the conventional input buffer circuit has the drawback that, even where the circuit is constructed with a CMOS, power dissipation is increased since the through-current flows from power source lines to grounding lines via the transistors.

SUMMARY OF THE INVENTION

It is an object of the present invention to provide an input buffer circuit without the drawbacks of the conventional input buffer circuit described above that the through-current does not flow through transistors at an intermediate potential on the data bus.

In order to attain the object described above, an input buffer circuit for a microprocessor according to the present invention provides a group of first data input terminals connected to a data bus for inputting first data in the range of a predetermined data train, a group of second data input terminals connected to the data bus for inputting second data in another range of the predetermined data train, and a terminal for inputting a first control signal indicating that the first predetermined data on the data bus are valid, and means for connecting the first predetermined data and the second predetermined data in the inside thereof, wherein the input buffer circuit further provides a terminal for inputting a second control signal indicating that the second data are invalid, and means for blocking and passing therethrough the first predetermined data inputted to the microprocessor using the first control signal and latching the output and for blocking and passing therethrough the second predetermined data inputted to the microprocessor using the second control signal and the first control signal and latching the output.

The means for blocking, passing and latching the output may be so constructed with two NOR gates and a NAND gate that an output signal of a first NOR gate, whose inputs are a signal obtained by synchronizing the first control signal with an internal clock signal and an inputted signal through a first data input terminal selected from the group of first data input terminals, is applied to a first latch, and an output signal of a second NOR gate, whose inputs are an output of a NAND gate, whose inputs are a signal obtained by synchronizing the second control signal with the internal clock signal and a reversed signal of the signal obtained by synchronizing the first control signal with the internal clock signal, and an inputted signal through a second data input terminal selected from the group of second data input terminals, is applied to a second data latch, and outputs of the first data latch and the second latch are used as signal outputs of the input buffer circuit.

BRIEF DESCRIPTION OF THE DRAWINGS

FIG. 3 is a time chart illustrating operation of a conventional microprocessor when bus sizing is involved.

DESCRIPTION OF THE PREFERRED EMBODIMENT

An embodiment of the present invention is described below with reference to the drawings.

Figure 1:
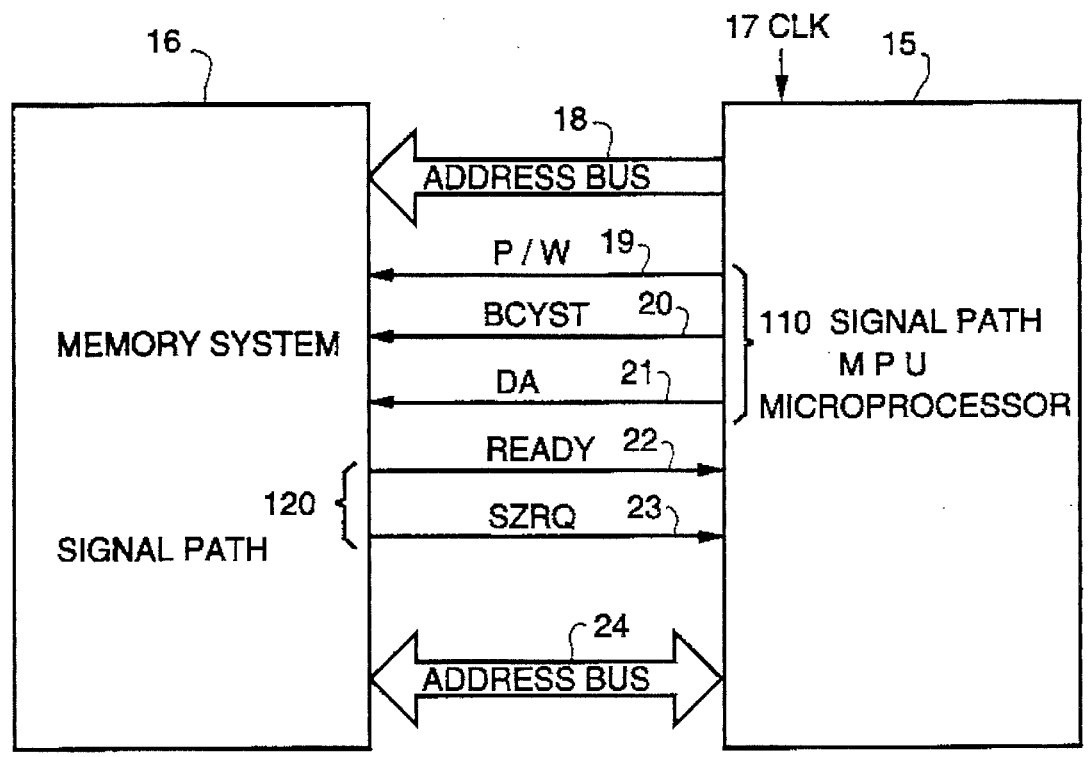
FIG. 1 is a block diagram showing the interface between an MPU and a memory system in an embodiment of the present invention and a conventional microprocessor.
Figure 4:
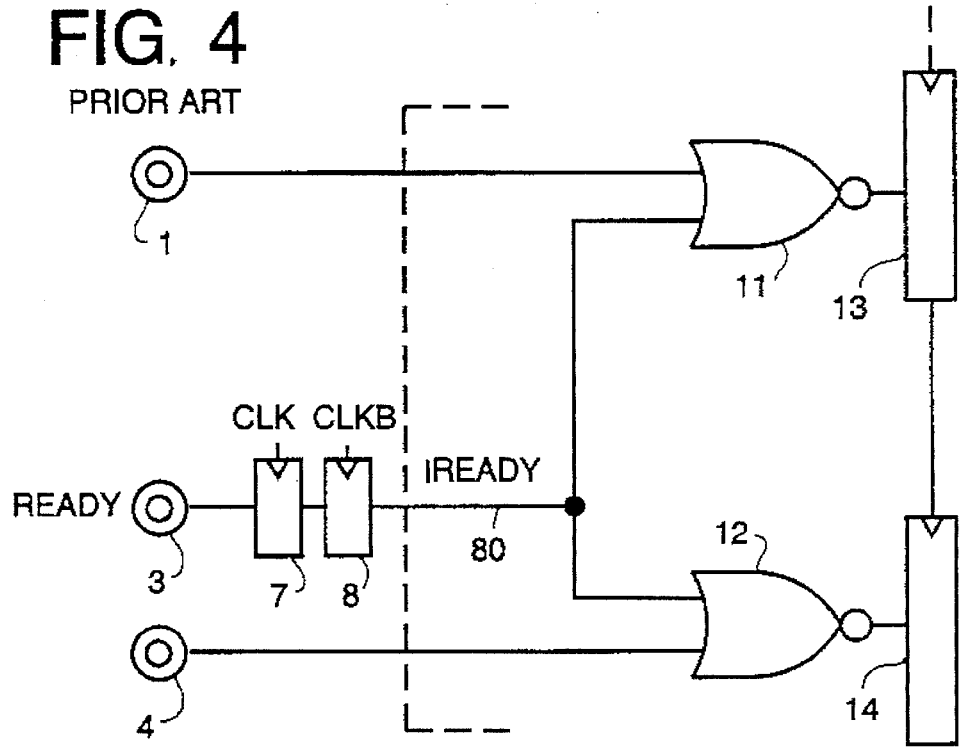
FIG. 4 is a circuit diagram showing a conventional input buffer circuit.
Figure 2:
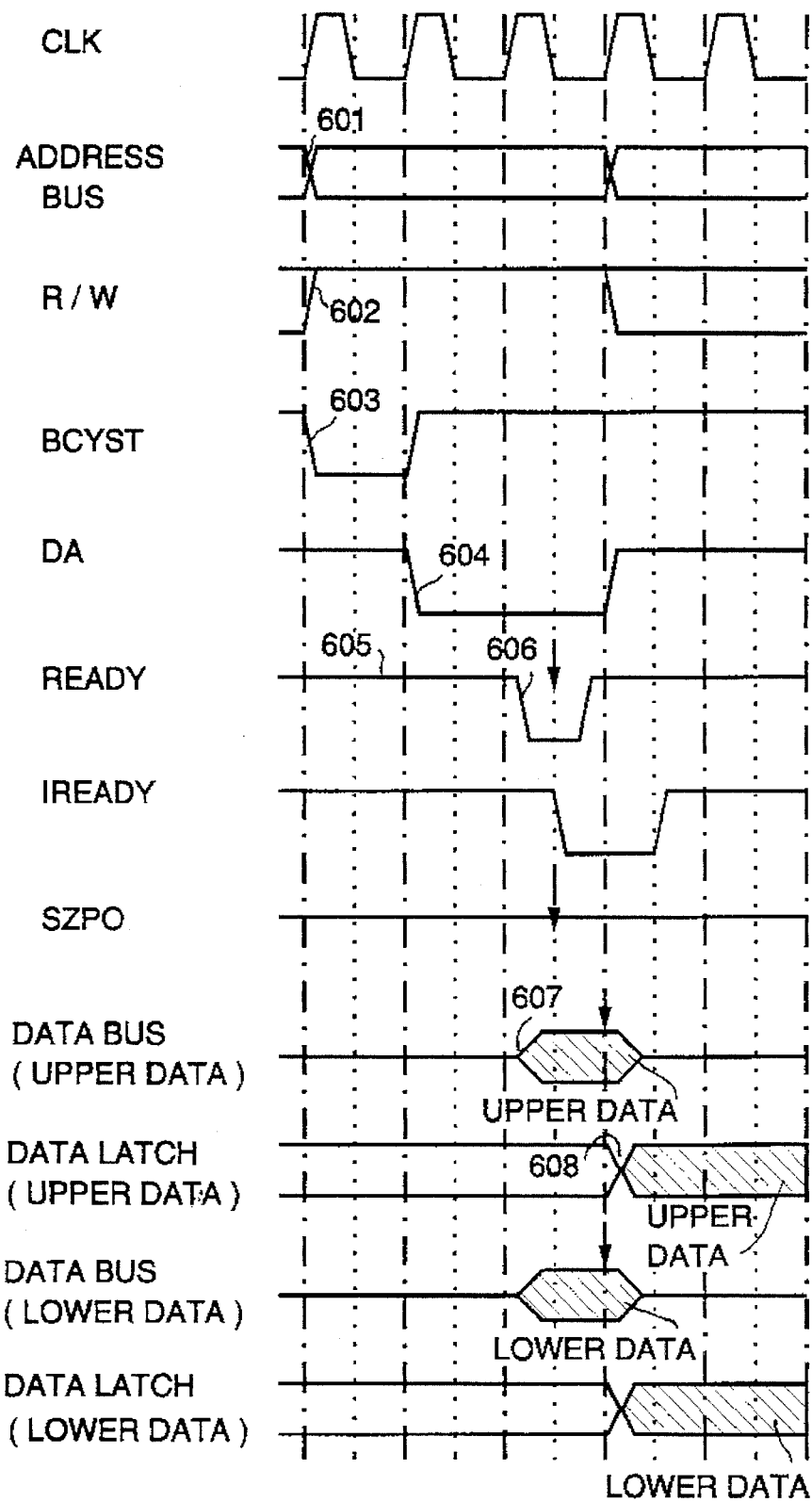
FIG. 2 is a time chart illustrating an example of operation of a conventional microprocessor when no bus sizing is involved.
Figure 5:
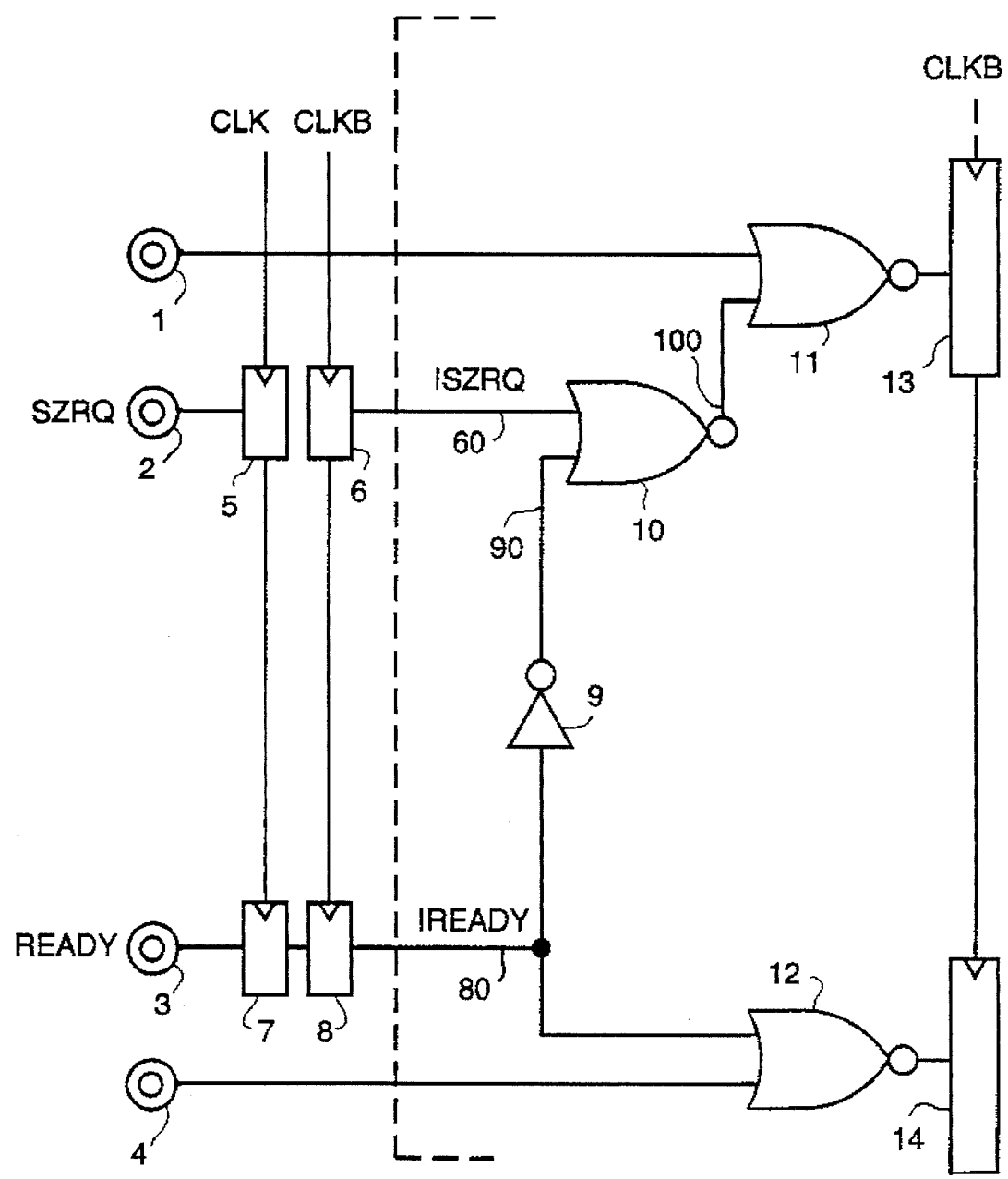
FIG. 5 is a circuit diagram of an embodiment of the input buffer circuit of the present invention.

FIG. 5 is a circuit diagram showing an embodiment of the input buffer circuit (inside broken line) of the present invention. The input buffer circuit of the present embodiment comprises first NOR gate 12, second NOR gate 13, NAND gate 10, inverter 9 and two latches 13, 14. Lower data input terminal 4 is connected to one of a pair of input terminals of NOR gate 12, and READY terminal 3 is connected to the other input terminal of NOR gate 12 via latches 7 and another latch 8. The output terminal of NOR gate 12 is connected to the data input terminal of first data latch 14. SZRQ terminal 2 is connected to one of a pair of input terminals of NAND gate 10 via latch 5 and 6, and the output terminal of latch 8 is connected to the other input terminal of NAND gate 10 via inverter 9. The output terminal of NAND gate 10 and upper data input terminal 1 are connected to a pair of input terminals of second NOR gate 11, and the output of NOR gate 11 is connected to the input terminal of second data latch 13. The output terminals of data latches 13 and 14 serve as the output terminals of the input buffer circuit. It should be noted that the configuration described above is actually made up of 16 sets in the input buffer circuit, but only one set is shown in FIG. 5 for simplification of illustration.

Functions of the components described above are described hereunder.

The upper 16 bits of the data bus are inputted through upper data input terminal 1. The lower 16 bits of the data bus are inputted through lower data input terminal 4. Negative logic signal READY which communicates that preparations for transfer of data have been made is inputted through terminal 3. Each of latches 7 and 8 synchronizes a signal inputted thereto asynchronously from corresponding READY terminal 3 at the timing of the falling edge of a clock signal. NOR gates 11 and 12 mask the upper and lower data, respectively. Upper data latch 13 latches the output of NOR gate 11 at the timing of the rising edge of the clock signal. Lower data latch 14 latches the output of NOR gate 12 at the timing of the rising edge of the clock signal.

Through SZRQ input terminal 2 a negative logic signal which communicates a bus sizing request from memory system 16 to microprocessor 15 is inputted. Latches 5 and 6 synchronize a signal inputted thereto asynchronously from SZRQ input terminal 3 at the timing of the falling edge of the clock signal to produce ISZRQ signal 60. Inverter 9 reverses IREADY signal 80. NAND gate 10 reverses the logical product between the output of inverter 9 and ISZRQ signal 60 to produce a mask signal for the case wherein upper data input terminal 1 is not used. Upper data mask signal 100 is the output signal of NAND gate 10. Lower data mask signal 80 is the output signal of latch 8. It should be noted that, in the circuit diagram of the input buffer circuit of the present invention shown in FIG. 5, signals denoted at CLK and CLKB are an input clock signal and a reversed clock signal, respectively, and it is assumed that they do not overlap each other at either a high level or low level due to a phase delay. Further, while upper data input terminal 1, lower data input terminal 4, NOR gates 11 and 12, data latches 13 and 14 are actually made up of 16 individual sets in the input buffer circuit, only a single set is shown in FIG. 5 for simplification of illustration.

Operation of the input buffer circuit of the present invention is described below.

Figure 6:
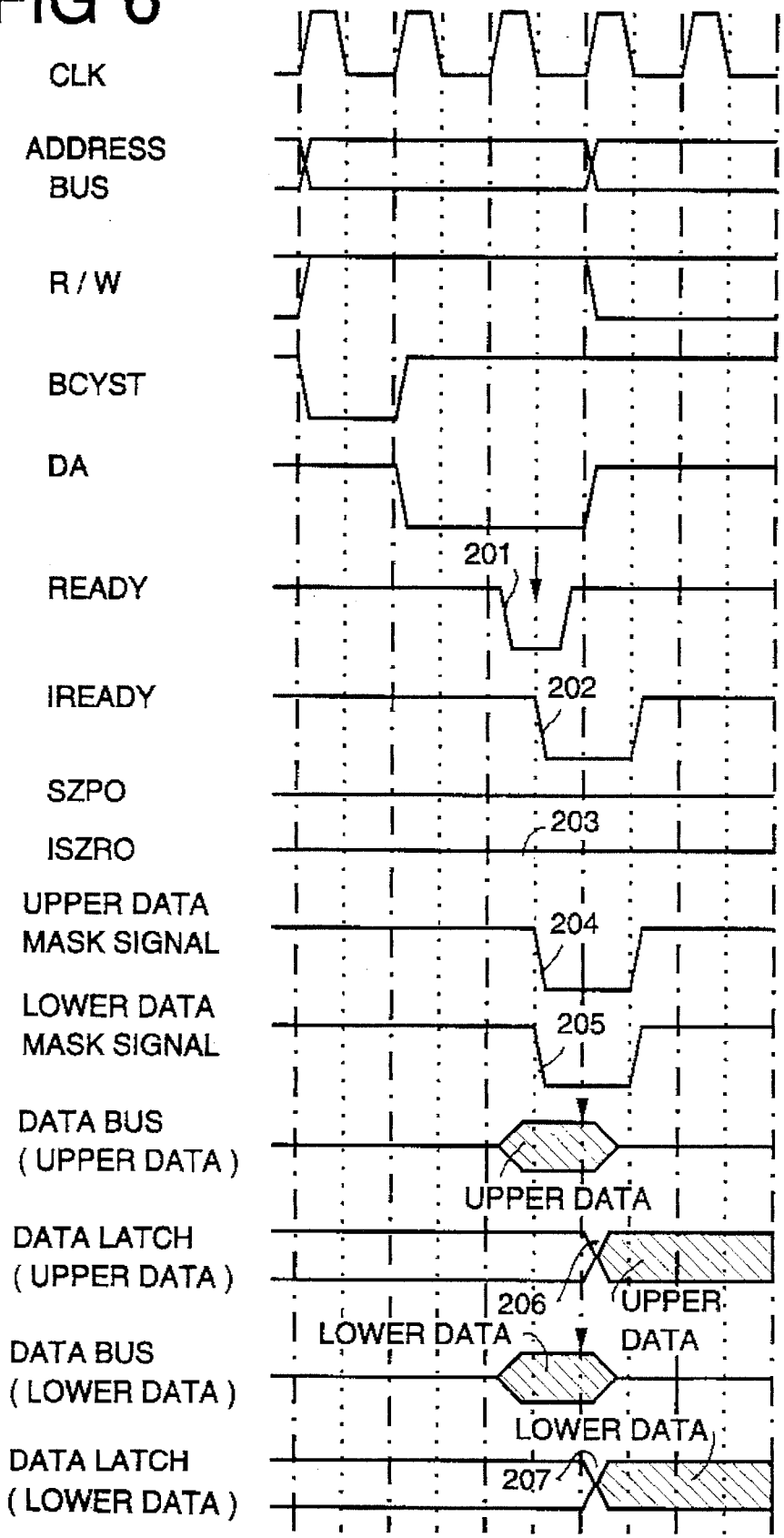
FIG. 6 is a time chart illustrating operation of the input buffer circuit shown in FIG. 5 when no bus sizing is involved.

Normal operation is described first with reference to the circuit diagram of the embodiment of the input buffer circuit (inside broken line) shown in FIG. 5 and the timing chart of the input buffer circuit shown in FIG. 6. READY signal 22, which has been rendered active at timing 201 by memory system 16, is synchronized with the falling edge of the clock signal by latches 7 and 8 to make an IREADY signal (202). Inverter 9 reverses the IREADY signal, and thus inverted IREADY signal 90 is inputted to NAND gate 10. Since the SZRQ signal also remains at a high level (inactive), ISZRQ signal 60 after it has passed latches 5 and 6 remains at a high level (203). NAND gate 10 reverses the logical product of IREADY signal 90 and ISZRQ signal 60 to produce upper data mask signal 100. This signal changes to a low level at the same timing that IREADY signal 80 (204) changes to a low level since ISZRQ signal 60 remains at a high level, and controls NOR gate 11 so that the data inputted from upper data input terminal 1 are sent to data latch 13. Data latch 13 latches the data inputted thereto synchronizing with the next rising edge of the clock signal (206). Operation on the lower data side is similar except that the ISZRQ signal is not used as a masking condition.

Lower data mask signal 80 changes, since the IREADY signal is used as is as lower data mask signal 80, to a low level at timing 205 and controls NOR gate 12 so that the data inputted thereto from lower data input terminal 4 are sent to data latch 14. Data latch 14 latches the data inputted thereto by synchronizing with the next rising edge of the clock signal (207).

Figure 7:
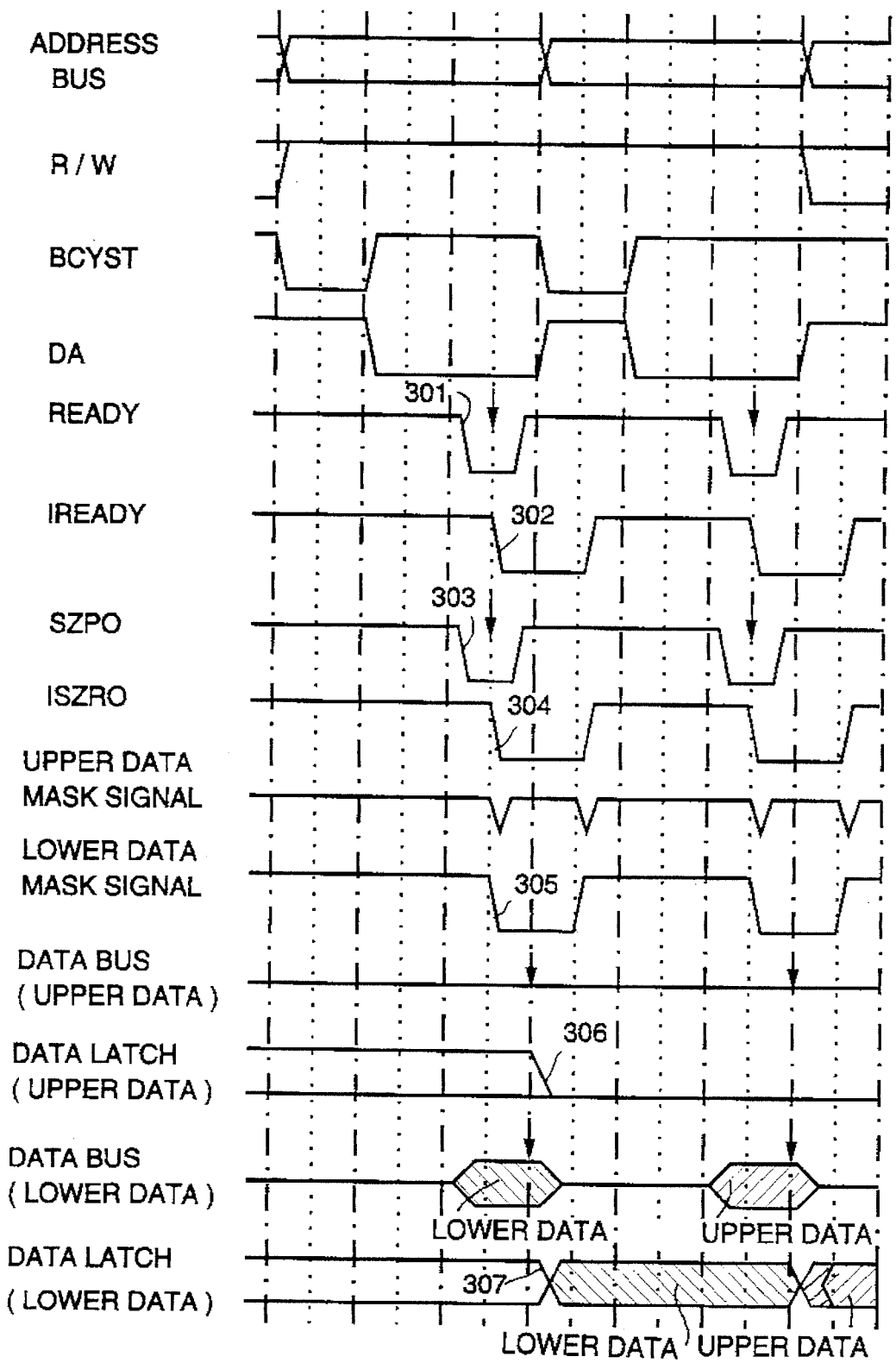
FIG. 7 is a time chart illustrating operation of the input buffer circuit shown in FIG. 5 when bus sizing is involved.

Next, operation when a signal inputted to the upper data input terminal is rendered invalid by bus sizing is described with reference to the circuit diagram of the input buffer circuit shown in FIG. 5 and the timing chart shown in FIG. 7.

READY signal 22, which has been rendered active at timing 301 by memory system 16, is synchronized into a signal synchronized with the falling edge of the clock signal by latches 7 and 8 to make IREADY signal (302). Inverter 9 reverses IREADY signal 80 and inputs it to NAND gate 10. In this instance, memory system 16 changes SZRQ signal 23 to a low level (active) at the same timing (303) to inform microprocessor 15 that the bus cycle is sized. SZRQ signal 23 is synchronized into a signal synchronized with the falling edge of the clock signal to make ISZRQ signal 60 (304). NAND gate 10 is inputted reversed signal 90 of IREADY signal 80 by inverter 9 and ISZRQ signal 60 to produce upper data mask signal 100. Since ISZRQ signal 60 is at a high level when the reversed signal of IREADY signal 80 is at a low level but is at a low level when the reversed signal of IREADY signal 80 is at a high level, upper data mask signal 100 always exhibits a high level. Consequently, the output of NOR gate 11 always exhibits a low level, and data latch 13 latches the low level. Accordingly, even when upper data input terminal 1 is at an intermediate potential, upper data latch 13 will not latch the intermediate potential at all (306). The lower data side circuit portion operates in a different manner from the upper data side circuit portion since ISZRQ signal 60 is not used to produce a mask signal.

In the lower data side circuit portion, since IREADY signal 80 is used as is as lower data mask signal 80, lower data mask signal 80 changes to a low level at timing 305 and controls NOR gate 12 so that the data inputted from lower data input terminal 4 are sent to data latch 14. Lower data latch 14 latches the input data by synchronizing with the rising edge of the clock signal (307). Since SZRQ signal 23 latched as ISZRQ signal 60 at timing 304 is active, microprocessor 15 recognizes that only the lower 16 bits of the data read in from data bus 24 are valid and an additional bus cycle must necessarily be issued for the upper 16 bits, and then again issues a bus cycle by sending address bus 18, R/W signal 19, BCYST signal 20 and DA signal 21. Since reading of the upper 16 bits in the additional bus cycle is similar to the operation in the reading cycle for the lower 16 bits, description thereof is omitted herein.

As described so far, in the input buffer circuit of the present invention, the output of NAND gate 10, which inputs, upon bus sizing, SZRQ signal 23 which communicates a bus sizing request from memory system 16 to microprocessor 15 and READY signal 22 which communicates that preparations for transfer of data have been made, is applied to one of the two input terminals of NOR gate 11 to mask the upper data signal applied to the other input terminal of NOR gate 11.

Accordingly, even if the potential at the data bus for connecting upper data input terminal 1 is an intermediate potential, the output of NOR gate 11 presents a low level, and data latch 13 latches the low level and will not latch an intermediate potential. Further, since no through-current flows through data latch 13, power dissipation is reduced.

What is claimed is:

1. An input buffer circuit comprising a first input terminal supplied with a first data signal, a second input terminal supplied with a second data signal, a first control terminal supplied with a first control signal, said first control signal taking an active level when at least said first data signal is valid and an inactive level when at least said first data signal is invalid, a second control terminal supplied with a second control signal, said second control signal taking an active level when said second data signal is valid and an inactive level when said second data signal is invalid, a first latch circuit having a first input node and a first control node, a second latch circuit having a second input node and a second control node, said first and second control nodes of said first and second latch circuits being supplied in common with a latch control signal and said first and second latch circuits latching data signals at said first and second nodes, respectively, when said latch control signal assumes an active level, first gate means coupled to said first input terminal, said first control terminal and said first input node of said first latch circuit for transferring said first data signal from said first input terminal to said first input node of said first latch circuit to allow said first latch circuit to latch said first data signal when said first control signal takes said active level and for masking said first data signal to preclude said first latch circuit from latching said first data signal when said first control signal takes said inactive level, and second gate means coupled to said second input terminal, said first and second control terminals and said second input node of said second latch circuit for transferring said second data signal from said second input terminal to said second input node of said second latch circuit to allow said second latch circuit to latch said second data signal when both of said first and second control signals take said active level and for masking said second data signal to preclude said second latch circuit from latching said second data signal when any one of said first and second control signals takes said inactive level.

2. The input buffer circuit as claimed in claim 1, wherein said first gate means masks said first input data signal by holding said first input node of said first latch circuit at a predetermined logic level irrespective of a level of said first data signal and said second gate means masks said second data signal by holding said second input node of said second latch circuit at a predetermined logic level irrespective of a level of said second data signal.

3. The input buffer circuit as claimed in claim 2, wherein first gate means comprises a first logic gate circuit having a first input end coupled to said first input terminal, a second input end coupled to said first control terminal and a first output end coupled to said first input node of said first latch circuit, said first logic gate circuit establishing a signal propagation path between said first input end and said first output end to transfer said first data signal to said first input node of said first latch circuit when said second input end receives said active level of said first control signal and holding said first output end at said predetermined logic level when said second input end receives said inactive level of said first control signal, and said second data means comprises a second logic gate circuit having a third input end coupled to said second input terminal, a fourth input end coupled to said first control terminal, a fifth input end coupled to said second control terminal and a second output end coupled to said second input node of said second latch circuit, said second logic gate circuit establishing a signal propagation path between said third input end and said second output end to transfer said second data signal to said second input node of said second latch circuit when said fourth and fifth input ends receive said active levels of said first and second control signals, respectively, and holding said second output end at said predetermined logic level when any one of said fourth and fifth input ends receives an associated one of said inactive levels of said first and second control signals.

4. An input buffer circuit for a microprocessor which includes first and second data terminals and first and second control terminals and operates in a first mode to receive a valid data signal at said first data terminal together with an invalid data signal at said second date terminal while receiving an active level at both of said first and second control terminals and in a second mode to receive a valid data signal at both of said first and second data terminals while receiving said active level at said first control terminal and an inactive level at said second control terminal, said input buffer circuit comprising first and second latch circuits each having an input node and a control node and latching a data signal at said input node therein in response to a latch control signal supplied to said control node, first gate means coupled between said first data terminal and the input node of said first latch circuit for establishing a signal propagation path therebetween when a first control signal applied thereto takes an active level and for holding the input node of said first latch circuit at a predetermined logic level irrespective of a level of said first data terminal when said first control signal takes an inactive level, second gate means coupled between said second data terminal and the input node of said second latch circuit for establishing a signal propagation path therebetween when a second control signal applied thereto takes an active level and for holding the input node of said second latch circuit at a predetermined logic level irrespective of a level of said second data terminal when said second control signal takes an inactive level, and third gate means coupled to said first and second control terminals for changing said first control signal from said inactive level to said active level in response to said first control terminal receiving said active level, for maintaining said second control signal at said inactive level in response to said second control terminal receiving said active level irrespective of said first control terminal receiving said active level and for changing said second control signal from said inactive level to said active level in response to said first and second control terminals receiving said active level and said inactive level, respectively.

5. The buffer circuit as claimed in claim 4, wherein each of said first and second gate means comprises a logic gate having a first input end coupled to receive an associated one of data signals at said first and second data terminals, a second input end supplied with an associated one of said first and second control signals and an output end coupled to an associated one of the input nodes of said first and second latch circuits, said logic gate transferring the data signal from the first input end to the output end when the second input end is supplied with said active level and holding the output end at one of high and low levels when the second input end is supplied with said inactive level.

* * * * *